United States Patent Office 3,282,904 Patented Nov. 1, 1966

3,282,904
PHOSPHORUS-CONTAINING COPOLYMERS
Fritz B. Marktscheffel, Berkeley Heights, and Albin F. Turbak, New Providence, N.J., assignors to Esso Research and Engineering Company, a corporation of Delaware
No Drawing. Filed Apr. 19, 1963, Ser. No. 274,309
16 Claims. (Cl. 260—88.1)

This invention relates to novel, highly crystalline copolymers of ethylenically unsaturated monomers. More particularly, it relates to a method of improving the dyeability of polymers made from propylene and higher alpha olefins by copolymerizing these olefins with 1-alkenyl phosphorus compounds.

It is well known that polyolefins are difficult to dye and therefore they are often treated with various chemicals, e.g. chromyl halides, chlorosulfonic acid, polybasic carboxylic acids, etc., to render them dyeable; alternatively, the polyolefins are blended with certain polyesters or polycarbonates to accomplish the same result. However, these post-polymerization processes are, in general, expensive and thus researchers are constantly searching for new, economical methods of producing dyeable polymers made from alpha olefins.

In this invention, a crystalline dyeable copolymer containing a major proportion of $C_3$ to $C_{20}$ alpha olefin units and a minor proportion of 1-alkenyl phosphorus units is prepared by copolymerizing an alpha olefin having from 3 to 20 carbon atoms with a 1-alkenyl phosphorus compound in the presence of a reducible transition metal compound and an organometal compound. This is surprising because: (1) propylene and higher alpha olefins are difficult to copolymerize with non-polar monomers other than ethylene and styrene; (2) although the copolymerization of ethylene and polar monomers such as 1-alkenyl phosphorus compounds in the presence of peroxide catalysts is known, there is nothing in the art which suggests the copolymerization of propylene and higher alpha olefins with 1-alkenyl phosphorus compounds, particularly in the presence of a catalyst comprising a reducible transition metal compound and an organometal compound; and (3) copolymers of ethylenically unsaturated monomers usually exhibit a low degree of crystallinity. For example, ethylene and propylene may each be homopolymerized independently so as to yield highly crystalline homopolymers, whereas the ethylenepropylene copolymer is substantially amorphous. In contrast to this, it has now been found that highly crystalline copolymers of propylene or higher alpha olefins and 1-alkenyl phosphorus compounds can be made.

According to this invention, an alpha olefin having the general formula $R—CH=CH_2$ wherein R is a $C_1$-$C_{18}$ alkyl radical, preferably a $C_1$ to $C_8$ alkyl radical, is copolymerized with a 1-alkenyl phosphorus compound of the type described below. The $R—CH=CH_2$ alpha olefin may be linear or branched; nonlimiting examples of the $R—CH=CH_2$ alpha olefin include: 1-butene, 1-pentene, 1-hexene, 1-heptene, 1-octene, 1-nonene, 1-decene, 1-undecene, 1-dodecene, 1-tetradecene, 1-hexadecene, 1-octadecene, 3-methyl-1-butene, 4-methyl-1-pentene, 4methyl-1-hexene, 5-methyl-1-hexene, 4,4-dimethyl-1-pentene, 4-methyl-1-heptene, 5,6,6-trimethyl-1-heptene, 5,5-dimethyl-1-octene, 5-methyl-1-nonene, vinyl cyclohexane, styrene, α-methylstyrene and the like; particularly preferred herein is propylene. The concentration of $R—CH=CH_2$ monomer units in the copolymer ranges from about 70 to 99.95 mole percent, preferably 90 to 99.90 mole percent.

The comonomer employed in preparing the copolymers of this invention is a 1-alkenyl phosphorus compound having at least 4 carbon atoms which can be conveniently represented by the following general formula:

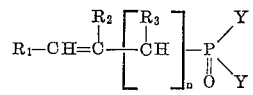

wherein $R_1$, $R_2$ and $R_3$ each represent a substituent containing no more than 9 carbon atoms selected from the group consisting of a hydrogen atom, an alkyl radical and an aromatic radical of the benzene series and at least one of $R_1$ and $R_2$ being a hydrogen atom, $n$ is an integer of 0 to 5 inclusive, and each Y represents a substituent containing no more than 9 carbon atoms selected from the group consisting of an alkyl radical, an alkoxy radical, an aromatic radical of the benzene series and a haloalkoxy radical (chlorine, bromine or iodine substituted). Nonlimiting examples of the 1-alkenyl phosphorus compounds which can be employed as the comonomer include: diethyl vinylphosphonate, a bis (β-haloethyl)vinylphosphonate wherein the halogen is chlorine, bromine or iodine, diethyl isopropenyl phosphonate, diethyl allylphosphonate, diethyl α-phenylvinylphosphonate, diethyl β-phenylvinylphosphonate, diethyl 2-methallylphosphonate, diphenyl vinylphosphonate, ethyl vinylmethylphosphinate, diethyl allyl phosphine oxide, dibenzyl ω-pentenephosphonate, ethyl vinylmethylphosphinite, diethyl vinylphosphonite, and the like; particularly preferred herein is bis (β-chloroethyl)vinylphosphonate. The concentration of the 1-alkenyl phosphorous units in the copolymer range in general from about 0.05 to 30 mole percent, preferably 0.10 to 10 mole percent.

The catalyst employed in preparing the copolymers of this invention is obtained by mixing a reducing organometal compound with a reducible transition metal compound, preferably in the presence of an inert organic diluent which can also serve as the copolymerization medium. More particularly, the organometal compound having reducing properties is generally a hydride or halide (other than a fluoride) of a Group I–a, II–a or III–a metal of the Periodic System. The Periodic System employed in describing this invention is that which appears in "The Merck Index," Merck & Co., Inc., Rahway, N.J., Seventh edition (1960).

Especially useful reducing organometal compounds are the organoaluminum compounds which can be conveniently represented by the general formula:

wherein R' is an alkyl group having not more than 4 carbon atoms, X is a halogen having an atomic number of at least 17 (i.e., X is chlorine, bromine or iodine) and $s$ is an integer of 0 to 2 inclusive. Suitable examples of the organoaluminum compound include $(C_2H_5)_3Al$, $(C_3H_7)_3Al$, $(i—C_4H_9)_3Al$, $(C_2H_5)_2AlCl$, $C_2H_5AlCl_2$, $(C_2H_5)_3Al_2Cl_3$, and the like. Particularly preferred herein is $(C_2H_5)_3Al$.

The reducible transition metal compound is one of a metal of Groups IV–b, V–b, VI–b and VIII of the Periodic System. Examples of such elements include titanium, zirconium, hafnium, thorium, uranium, vanadium, colombium, tantalum, chromium, molybdenum and tungsten as well as manganese and iron. Suitable examples of the compounds of these metals include the halides having an atomic number of at least 17, i.e. the chlorides, bromides or iodides, oxy halides such as oxychlorides or oxybromides, freshly precipitated oxides or hydroxides, organic compounds such as alcoholates, oxalates, acetates, benzoates, acetonyl acetonates, and the like. The most commonly used salts are those of titanium, zirconium, thorium, uranium and chromium. Titanium salts are particularly useful, such as titanium tetrachloride, titanium oxychloride or titanium acetonyl acetonate. Particularly preferred herein is the crystalline $TiCl_d$ wherein $d$ is a number between 2 and 3 inclusive.

As stated above, the catalyst is prepared by mixing the metal compound having reducing properties with the reducible transition metal compound, preferably in the presence of an inert organic diluent. Generally the molar ratio of the reducing metal compound to the reducible transition metal compound is in the range of about 0.5:1 to 10:1, preferably about 1:1 to 3:1. Although the concentrations of the catalyst components are not critical, sufficient amounts of the diluent are employed such that the concentration of each component in the diluent is generally in the range of 0.1 to 10 g./l., more preferably 0.5 to 5 g./l. Generally, mixing temperatures in the range of about −20 to 100° C., and mixing times of about 5 minutes to 24 hours are employed; the catalyst can either be a simple admixture or a cocrystalline compound such as is obtained by ball-milling the reducible transition metal compound with the reducing metal compound. If desired, the catalyst can be aged by mixing the catalyst components with the inert organic diluent and allowing the resultant catalyst mixture to stand for about 10 minutes to 48 hours or longer at a temperature of about 20° C. to 100° C. prior to its use in the copolymerization reaction. The optimum conditions for preparing the catalyst depend in large measure upon the particular metal compound used as the reducing agent. For example, aluminum triethyl can be employed using relatively low concentrations and temperatures to form an active catalyst. On the other hand, when using aluminum diethylchloride at approximately 0.5 wt. percent concentration, heating times of about 15 to 30 minutes at temperatures of about 40 to 80° C. give the most active catalyst.

The inert organic diluents employed in the preparation of the catalyst as well as in the copolymerization reaction itself, should be a liquid at the operating conditions of the copolymerization reaction. Suitable examples of the diluent include aliphatic hydrocarbons such as pentane, isopentane, hexane, heptane, isooctane and the like; cycloaliphatic hydrocarbons such as cyclopentane, cyclohexane, decahydronaphthalene and the like; halogenated aliphatic hydrocarbons such as methyl chloride, tetrachloroethylene and the like; aromatic hydrocarbons such as benzene, toluene, ethylbenzene, the xylenes, tetrahydronaphthalene, and the like; halogenated aromatic hydrocarbons, e.g. the mono- or dichlorobenzenes, and the like.

In preparing and using catalysts according to this invention, all steps should be carried out in the substantial absence of oxygen, moisture, carbon dioxide or other harmful impurities. This can be readily accomplished by blanketing all the raw materials, i.e. the catalyst components, monomers, inert diluents, etc. with an inert gas such as dry nitrogen or argon. Electron donors such as amines, mercaptans, ketones, aldehydes, etc. are generally poisonous to the catalyst system and it is generally desirable that the monomer contain less than about 200 p.p.m. and the diluent less than about 50 p.p.m. by weight of these impurities. Preferably all materials are purified, e.g. by drying, distillation, etc. prior to their use.

The copolymerization process in accordance with this invention is carried out at conditions generally used in the well-known homopolymerization of $C_3$–$C_{20}$ alpha olefins to prepare high molecular weight homopolymers suitable as "plastics." These conditions depend somewhat on the specific $C_3$–$C_{20}$ alpha olefin involved and the specific type of copolymer desired. In a typical copolymerization procedure, the reactor, e.g. a stainless steel rocking bomb, is flushed with dry nitrogen and is charged with the catalyst which has been prepared as described hereinabove. If no diluent has been employed in the catalyst preparation, preferably sufficient amounts (i.e. such that the concentration of each catalyst component in the diluent is generally in the range of 0.1 to 10 g./l.) of the diluent should be employed in the copolymerization reaction; the catalyst can, of course, be prepared "in situ," i.e. the catalyst components can be placed in the reaction individually followed by the addition of the diluent and monomers; thus the catalyst components can be mixed as the copolymerization reaction is taking place.

After the catalyst and diluent have been placed in the reactor, the desired 1-alkenyl phosphorus compound is added, the reactor is sealed, and the $C_3$–$C_{20}$ alpha olefin is charged into the reactor under pressure. If desired, the olefin can also be chilled below its boiling point and added to the pre-chilled reactor at atmospheric pressure; those alpha olefins having a boiling point at or above room temperature may, of course, be added to the reactor at room temperature and pressure. The monomer concentrations in the diluent are not critical and concentrations of 0.1 to 100 wt. percent, preferably 2 to 50 wt. percent, may be employed.

The copolymerization reaction is then carried out at a temperature in the range of about −25 to 200° C., preferably 50 to 100° C. The monomers are allowed to remain in contact with the catalyst for a period of time ranging from about 5 minutes to 10 hours, preferably 30 minutes to 4 hours, during which time more diluent can be added so as to maintain the total pressure at the desired level which can be as low as atmospheric and as high as 2000 p.s.i.g. but preferably is in the range of 50 to 500 p.s.i.g. It should be realized that the pressure is not critical and is necessarily dependent upon the particular alpha olefin selected and the copolymerization reaction temperature.

The amount of monomers added will, of course, be determined by catalyst activity, reaction time, desired monomer conversions, desired amounts of 1-alkenyl phosphorus units in the copolymer, etc. Generally, about 50 to 1000 g., preferably 100 to 250 g., of the $C_3$–$C_{20}$ alpha olefin per g. of the reducible transition metal compound is employed; normally 2 to 400 millimoles, preferably 5 to 50 millimoles, of the desired 1-alkenyl phosphorus compound per mole of the selected $C_3$–$C_{20}$ alpha olefin is employed in the copolymerization reaction. Generally, it is useful for good operability to limit the concentration of copolymer in the reaction mixture to less than 50 wt. percent. If necessary, the copolymer concentration can be maintained at or below this level by the addition of more diluent during the copolymerization reaction.

At the end of the reaction, the solid copolymer is precipitated with about 0.1 to 100 v./v. reaction mixture of a $C_1$–$C_6$ alkanol such as methyl alcohol, isopropyl alcohol, n-butyl alcohol, and the like. The precipitated product is then filtered and washed with more alcohol and may then be finished by the addition of suitable stabilizers and inhibitors followed by drying according to methods now well known in the polymer field. If desired, the product may be extracted with acids, bases, complexing agents, etc., in order to reduce catalyst residue to a low level prior to the addition of stabilizers or inhibitors.

The copolymerization reaction can, of course, also be carried out as a continuous operation in which case the catalyst components, preferably mixed with sufficient diluent, may be continuously added to the reactor either separately or previously combined. Separate streams of additional diluent can also be continuously added so as to maintain a suitable polymer concentration in the diluent, achieve desirable monomer conversion, and obtain a high catalyst efficiency, i.e. in the range of 20 to 100 g. copolymer per g. catalyst.

The copolymers of this invention have a high degree of crystallinity, i.e. normally at least 50% but usually at least 75%, as determined by X-ray analysis; the Kinsinger (Kinsinger, Thesis, University of Pennsylvania, 1957) molecular weight of the copolymers range in general from about 500,000 to 5,000,000. Due to the presence of 1-alkenyl phosphorus units in the copolymer, the copolymers exhibit satisfactory receptivity to various commercially available basic and dispersant-type dyestuffs; the degree of dyeability of the copolymer is, of course, determined by the mole percent of 1-alkenyl phosphorus units present in the copolymer. Furthermore, the copolymers of this invention exhibit satisfactory flame-retardant properties at the higher 1-alkenyl phosphorus unit concentration, i.e. above 3 mole percent.

This invention and its advantages will be better understood by reference to the following examples:

*Example 1*

Into a 280 ml. Aminco bomb was placed 0.57 g. (5 mmol.) $(C_2H_5)_3Al$, 0.62 g. (4 mmol.) $TiCl_3$, 50 ml. xylene, 1.32 g. (5.67 mmol.) bis ($\beta$-chloroethyl)vinylphosphonate. These operations were carried out under a dry nitrogen atmosphere.

The bomb was then sealed, placed in a heated shaker, and connected to a propylene source without exposure to air. Fifty grams (1190 mmol.) of propylene was pressured into the bomb while the bomb was being shaken. The bomb was heated to 80° C. and the internal temperature rose to 134° C. within six minutes. The temperature was allowed to come back to 80° C. and the bomb was then heated for 2 hours at 80° C. The heat source was turned off at the end of the 2 hour period and the bomb allowed to cool, while rocking, to room temperature.

The product was isolated by mixing the contents of the bomb with 500 ml. isopropyl alcohol containing 5 ml. acetylacetone and 5 ml. concentrated hydrochloric acid followed by 15 minutes' stirring in a Waring Blendor and subsequent filtration. The copolymer was again washed with fresh isopropyl alcohol and vacuum dried at 80° C.

The catalyst components, polymerization conditions and copolymer characteristics are tabulated in Table I below. The molecular weight was determined from the inherent viscosity of the copolymer (the inherent viscosity was measured in decalin at 135° C.) according to the method disclosed by Kinsinger, Thesis, University of Pennsylvania (1957). Except as noted in Table I, Runs B, C and D were performed under identical conditions to that described above for Run A.

produced according to the procedures set forth in Example 1 above, Run A was analyzed as to its phosphorus and chlorine content prior to and after extraction with hot dimethylformamide in a Kumagawa extractor. The results were as follows:

|  | Before Extraction | After Extraction |
|---|---|---|
| Mole Percent Phosphorus | 0.067 | 0.064 |
| Mole Percent Chlorine | 0.15 | 0.11 |

Additional extractions were carried out with diethyl ether, methanol and n-heptane. Subsequent elemental analysis of the copolymer fractions indicated the presence of phosphorus and chlorine in each fraction. These results indicate that the product is a true copolymer rather than a mere admixture of homopolymers.

*Example 3*

Polyolefins ordinarily contain no functional groups and must therefore be subjected to post-polymerization treatments such as grafting, sulfonation, peroxidation and the like in order to render them dyeable. In contrast, the copolymers of this invention contain sufficient amounts of bound phosphorus such that the copolymers have the ability to accept basic- and dispersed-type commercially available dyestuffs in the absence of any post-polymerization treatments. Film samples were pressed from the copolymer described in Run A of Table I. These film samples containing 0.07 mole percent phosphorus were dyed simultaneously with control films of polypropylene which had been prepared by homopolymerizing propylene in the presence of a titanium trichloride-triethylaluminum catalyst. The dyes utilized in this experiment were Genacryl Blue, Genacryl Yellow and Cibacet Rubine (the former two dyes are basic-type dyes while the latter is a dispersed-type dye). Inspection of the dyed copolymer films indicated that the copolymer of this invention dyed to deep colors whereas the control film showed only a faint tint. Furthermore, the dyed copolymer film samples retained their deep hues upon extraction with perchloroethylene at room temperature.

*Example 4*

In order to demonstrate that the presence of phosphorus in the copolymer resulted in satisfactory flame TABLE I.—COPOLYMERIZATION OF PROPYLENE AND BIS ($\beta$-CHLOROETHYL)VINYLPHOSPHONATE

[300 ml. stainless steel bomb, 80° C. copolymerization temperature, 50 ml. xylene diluent]

|  | Run | | | |
|---|---|---|---|---|
|  | A | B | C | D |
| Catalyst: |  |  |  |  |
| (a) $(C_2H_5)_3Al$, mmol | 5 | 5 | 10 | 5 |
| (b) $TiCl_3$ | 4 | 4 | 4 | 4 |
| Molar Ratio: (a)/(b) | 1/0.8 | 1/0.8 | 2.5/1 | 1/0.8 |
| Monomers: |  |  |  |  |
| (c) Propylene, mmols | 1,190 | 1,190 | 1,190 | 1,190 |
| (d) Bis ($\beta$-chloroethyl)vinylphosphonate, mmols | 5.67 | 11.3 | 11.3 | 16.97 |
| Molar Ratio: (a)/(d) | 1/1.13 | 1/2.26 | 1/1.13 | 1/3.4 |
| Copolymerization Conditions: |  |  |  |  |
| Reaction Time, Hours | 2 | 2 | 2 | 2 |
| Initial Propylene Pressure, p.s.i.g | 270 | 335 | 370 | 315 |
| Final Propylene Pressure, p.s.i.g | 270 | 295 | 280 | 285 |
| Copolymer Properties: |  |  |  |  |
| Yield, grams | 41.7 | 18 | 33 | 3.7 |
| Kinsinger Mol. Wt. $\times 10^{-3}$ | 833.7 | 1,734 | 2,408 | 799.4 |
| Mole percent of (d) units in copolymer | 0.07 | 0.6 | 0.06 | 6.7 |
| Tensile Strength, lbs./sq. in | 3,050 |  |  |  |
| Elongation, percent | 24 |  |  |  |
| M.P., °C | 169.5 | 167.8 | 163.5 | >320 |
| Crystallinity by X-ray analysis | >70 | >70 | >70 | >50 |

*Example 2*

In order to demonstrate that a true copolymer of propylene and bis ($\beta$-chloroethyl)vinylphosphonate had been retardance properties, equal quantites of polypropylene and polypropylene - bis($\beta$ - chloroethyl)vinylphosphonate copolymer were separately ignited on a spatula and the time to extinguishment was measured in seconds. The results were as follows:

TABLE II

| Mole percent phosphorus in the copolymer: | Seconds to extinguishment |
|---|---|
| 0.00 | 15–20 |
| 0.06–0.10 | 15–20 |
| 0.60 | 15–20 |
| 2–3 | 12–15 |
| 6.7 | 8–12 |

*Example 5*

A two liter resin flask, equipped with stirrer, ice-water condenser, thermometer and dropping funnel was purged with anhydrous nitrogen. 900 ml. of xylene diluent and 1.625 g. (50 mmoles) of bis($\beta$-chloroethyl)vinylphosphonate were added to the flask and the reaction mixture was saturated with propylene during which time the flask was heated to 55° C. A catalyst mixture comprising 0.57 g. (5 mmoles) $(C_2H_5)_3Al$, 0.62 g. (4 mmoles) $TiCl_3$ and 100 ml. xylene which had been aged for 15 minutes at room temperature was added rapidly to the resin flask with stirring and the flask was then heated to 80° C. The flask was maintained at 80° C. for one hour during which time propylene was continuously introduced into the reaction mixture. The reaction mixture was then cooled to room temperature and the product was isolated using the procedure set forth in Run A of Example 1. Table III indicates the catalyst components, monomers and copolymerization conditions.

TABLE III.—COPOLYMERIZATION OF PROPYLENE AND BIS ($\beta$-CHLOROETHYL)VINYLPHOSPHONATE AT ATMOSPHERIC PRESSURE
[2 l. resin flask 900 ml. xylene diluent, 1 hour at 80° C.]

| | Run | |
|---|---|---|
| | E | F |
| Catalyst: | | |
| (a) $(C_2H_5)_3Al$, mmols | 5 | 5 |
| (b) $TiCl_3$, mmols | 4 | 4 |
| Molar ratio (a)/(b) | 1/0.8 | 1/0.8 |
| Monomers: | | |
| (c) Propylene, mmols | (¹) | (¹) |
| (d) Bis($\beta$-chloroethyl)vinylphosphonate, mmols | 5.0 | 10 |
| Molar ratio (a)/(d) | 1/1 | 1/2 |
| Yield of copolymer, grams | 2 | None |

¹ Continuous stream.

A comparison of Run E (Table III) with Run A (Table I) indicates that although the copolymer may be prepared at atmospheric pressure in the presence of high alpha olefin concentrations, copolymerization carried out above atmospheric pressure produce higher yields of the copolymer. Furthermore, Run F (Table III) indicates that high 1-alkenyl phosphorus compound to organometal compound ratios are not preferable.

*Example 6*

Following the procedure set forth in Example 1, Run A, 50 g. 3-methyl-1-butene was copolymerized with 1.32 g. bis($\beta$-chloroethyl)vinylphosphonate. The reaction mixture yielded 3.2 g. copolymer which contained 4.2 mole percent bis($\beta$-chloroethyl)vinylphosphonate units; the copolymer melted at 270° C. Samples of the copolymer were self-extinguishing when a flame was applied to them.

*Example 7*

Film samples were pressed from polypropylene and from the copolymers prepared in Runs B and C (Table I). The films were then printed with an alcohol soluble shellac-base ink and a polyamide ink by the well known hand-draw down technique. After allowing the films to dry for 10–15 minutes, pressure sensitive adhesive tape was placed over the printed films and the quantity of ink remaining on the films was recorded as a measure of the "printability" of the films. Polypropylene homopolymer films exhibited no adhesion of either ink, the copolymer of Run C containing 0.06 mole percent phosphorus exhibited no adhesion of either ink and the copolymer of Run B containing 0.6 mole percent phosphorus exhibited 10% adhesion of the shellac-base ink and 100% adhesion of the polyamide ink. These results point out the superior properties, as regards printability, of the copolymers of this invention.

*Example 8*

Following the procedure as set forth in Example 3, polypropylene is copolymerized with a 1-alkenyl phosphorus compound and films of the resultant copolymer are dyed to deep, wash-fast hues with the following basic-type dyestuffs: Methyl Violet LRP (basic violet #1), Calcozine Orange YS (basic orange #2), Malachite Green Powder (basic green #4), Methylene Blue 2B (basic blue #9), Sevron Blue 5G (basic blue #4), Sevron Blue B (basic blue #21), Crystal Violet Powder (basic violet #3).

Although the copolymerization reactions in the examples were carried out batchwise, it is obviously within the scope of this invention to prepare catalysts continuously or batchwise and to utilize either preparation in continuous or batch copolymerizations.

The advantages of this invention will be apparent to the skilled in the art. Novel, highly crystalline copolymers having satisfactory molecular weights, tensile strength, receptiveness to commercially available dyestuffs, and flame-retardance are made available for use in films, fibers, packaging, tubing, etc.

It is to be understood that this invention is not limited to the specific examples which have been offered merely as illustrations and that modifications can be made without departing from the spirit of the invention.

What is claimed is:

1. A copolymer being at least 50% crystalline comprising a major portion of aliphatic alpha olefin units having before polymerization the general formula $$R-CH=CH_2$$

where R is a $C_1$–$C_{18}$ alkyl radical and a minor portion of 1-alkenyl phosphorus units, said 1-alkenyl phosphorus units having before polymerization the formula:

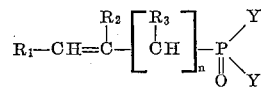

wherein $R_1$, $R_2$ and $R_3$ each represent a substituent containing no more than 9 carbon atoms selected from the group consisting of a hydrogen atom, an alkyl radical and an aromatic radical and at least one of $R_1$ and $R_2$ being a hydrogen atom, $n$ is an integer of 0 to 5 inclusive, and each Y represents a substituent containing no more than 9 carbon atoms selected from the group consisting of an alkyl radical, an alkoxy radical, an aromatic radical and haloalkoxy radical.

2. The copolymer of claim 1 wherein the aliphatic alpha olefin has from 3 to 10 carbon atoms.

3. A copolymer being at least 50% crystalline comprising a major portion of aliphatic alpha olefin units having before polymerization the general formula $$R-CH=CH_2$$

wherein R is a $C_1$–$C_{18}$ alkyl radical and a minor portion of 1-alkenyl phosphorus units, said 1-alkenyl phosphorus compound having before polymerization the formula:

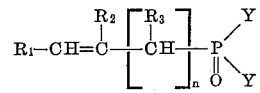

wherein $R_1$, $R_2$ and $R_3$ each represent a substituent containing no more than 9 carbon atoms selected from the group consisting of a hydrogen atom, an alkyl radical and an aromatic radical and at least one of $R_1$ and $R_2$ being a hydrogen atom, $n$ is an integer of 0 to 5 inclusive, and each Y represents a substituent containing no more than 9 carbon atoms selected from the group consisting of an alkyl radical, an alkoxy radical, an aromatic radical, and a haloalkoxy radical, said copolymer having a Kinsinger molecular weight of at least 500,000.

4. The crystalline copolymer of claim 3 wherein said alpha olefin has from 3 to 8 carbon atoms.

5. A highly crystalline random copolymer comprising 70 to 99.95 mole percent propylene units and 0.05 to 30 mole percent bis($\beta$-chloroethyl)vinylphosphonate units, said copolymer having a Kinsinger molecular weight of at least 500,000 and a crystallinity of at least 50% as determined by X-ray analysis.

6. A method of preparing a random copolymer being at least 50% crystalline having satisfactory dyeability which comprises (a) reacting an alphatic alpha olefin having the general formula R—CH=CH$_2$ wherein R is a $C_1$–$C_{18}$ alkyl radical with a 1-alkenyl phosphorus compound, said phosphorus compound having a formula:

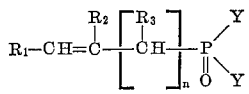

wherein $R_1$, $R_2$ and $R_3$ each represent a substituent containing no more than 9 carbon atoms selected from the group consisting of a hydrogen atom, an alkyl radical and an aromatic radical and at least one of $R_1$ and $R_2$ being a hydrogen atom, $n$ is an integer of 0 to 5 inclusive, and each Y represents a substituent containing no more than 9 carbon atoms selected from the group consisting of an alkyl radical, an alkoxy radical, an aromatic radical and a haloalkoxy radical in the presence of a catalyst system made up of a transition metal halide and an alkyl aluminum compound and (b) recovering a solid copolymer comprising a major portion of aliphatic alpha olefin units and a minor portion of 1-alkenyl phosphorus units.

7. The process of claim 6 wherein said alpha olefin has from 3 to 10 carbon atoms.

8. The method of claim 6 wherein the aliphatic alpha olefin is propylene.

9. The method of claim 6 wherein the 1-alkenyl phosphorus compound is bis($\beta$-chloroethyl)vinylphosphonate.

10. The method of claim 6 wherein the catalyst system is made up of titanium trichloride and triethyl aluminum.

11. A method for preparing a random coplymer being at least 50% crystalline comprising 70 to 99.95 mole percent aliphatic olefin units having the general formula R—CH=CH$_2$ wherein R is a $C_1$–$C_{18}$ alkyl radical and 0.05 to 30 mole percent 1-alkenyl phosphorus units having at least 4 carbon atoms per unit which comprises: (a) reacting an aliphatic alpha olefin having the general formula R—CH=CH$_2$ wherein R is a $C_1$–$C_{18}$ alkyl radical and a 1-alkenyl phosphorus compound having the formula:

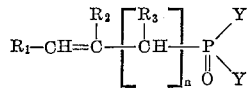

wherein $R_1$, $R_2$ and $R_3$ each represent a substituent containing no more than 9 carbon atoms selected from the group consisting of a hydrogen atom, an alkyl radical and an aromatic radical and at least one of $R_1$ and $R_2$ being a hydrogen atom, $n$ is an integer of 0 to 5 inclusive, and each Y represents a substituent containing no more than 9 carbon atoms selected from the group consisting of an alkyl radical, an alkoxy radical, an aromatic radical and a haloalkoxy radical in the presence of a catalyst system made up of a transition metal halide and an alkyl aluminum compound at a temperature in the range of —25 to 200° C. and (b) recovering a polymer being at least 50% crystalline.

12. The process of claim 11 wherein the aliphatic alpha olefin has from 3 to 10 carbon atoms.

13. The process of claim 11 wherein the aliphatic alpha olefin is propylene.

14. The process of claim 11 wherein the 1-alkenyl phosphorus compound is bis($\beta$-chloroethyl)vinylphosphonate.

15. The process of claim 11 wherein said catalyst system is made up of titanium trichloride and triethyl aluminum.

16. A method for producing a random copolymer being at least 50% crystalline comprising 70 to 99.95 mole percent propylene units and 0.05 to 30 mole percent bis($\beta$-chloroethyl)vinylphosphonate units, which comprises: (a) reacting propylene and bis($\beta$-chloroethyl) vinylphosphonate in the presence of a catalytic amount of titanium trichloride and triethyl aluminum at a temperature in the range of 50 to 100° C. and (b) recovering the crystalline copolymer.

References Cited by the Examiner

Arcus et al., J. Chemical Soc., 1956, page 4607 relied on.

Gefter, Organophosphorous Monomers and Polymers, Associated Technical Services, Inc., Glen Ridge, N.J., 1962. Originally published in Russian in 1960. Pages 151-152 and 186-198 relied on.

JOSEPH L. SCHOFER, *Primary Examiner.*

JAMES A. SEIDLECK, *Examiner.*

M. B. KURTZMAN, *Assistant Examiner.*